UNITED STATES PATENT OFFICE.

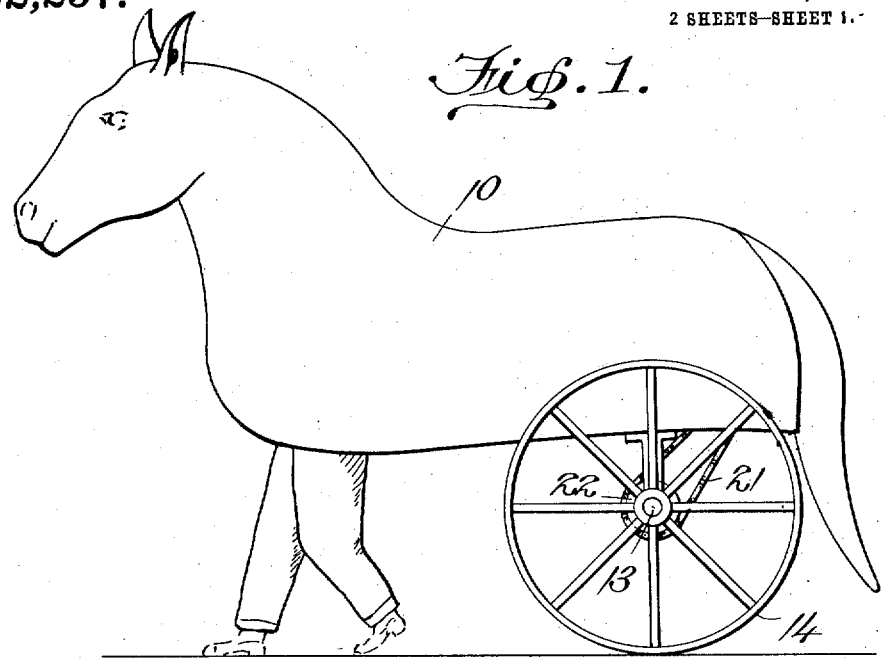
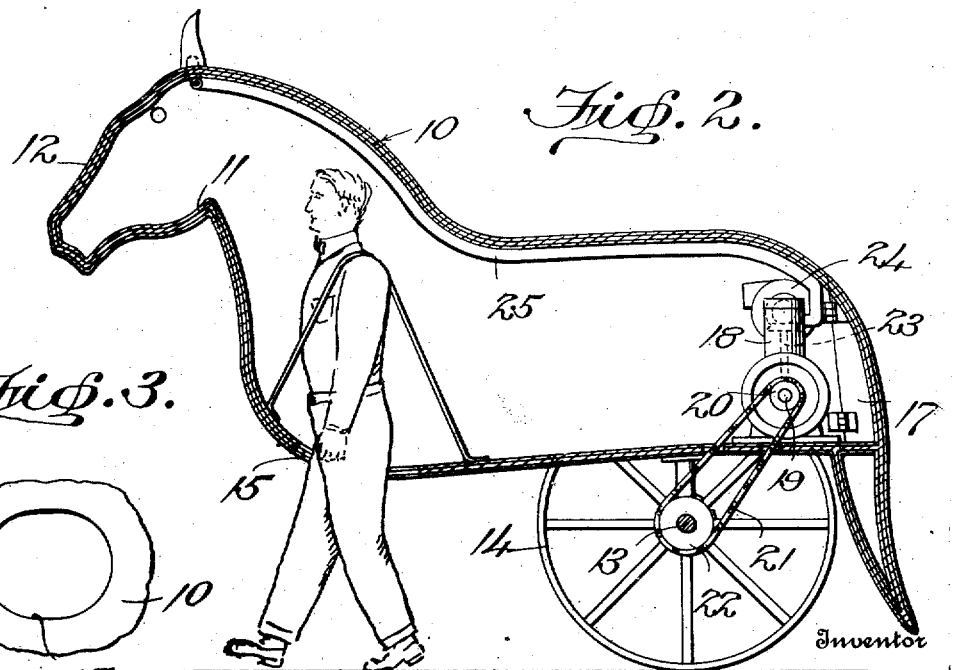
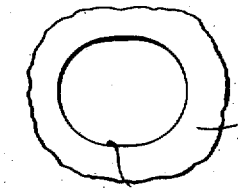

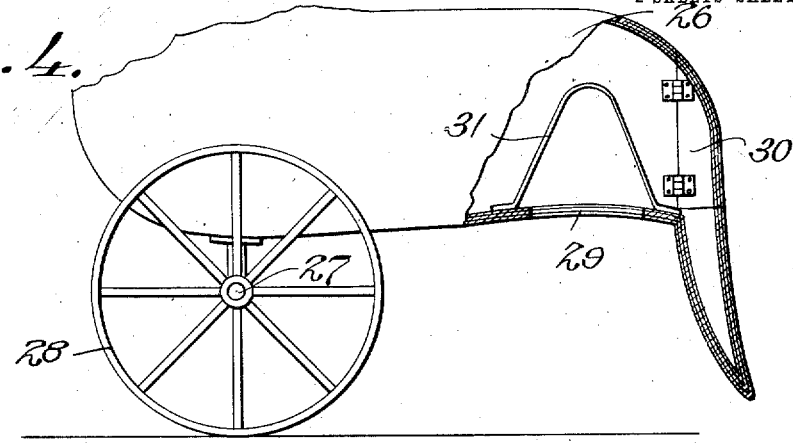
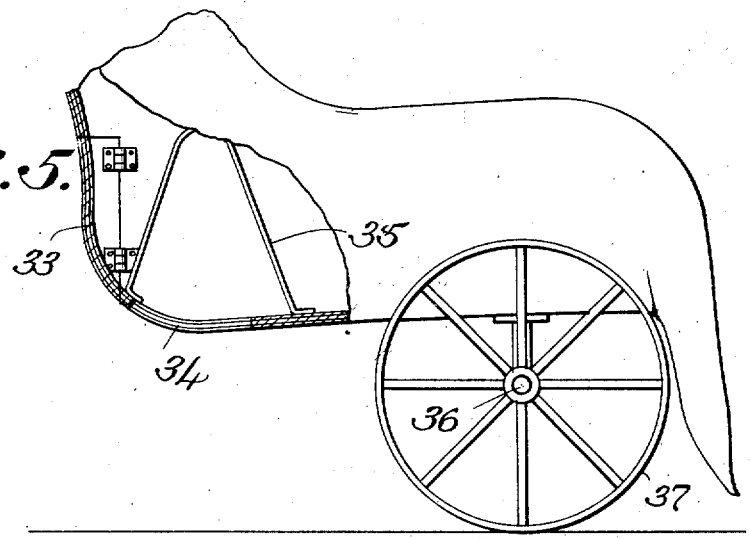

OTTO FRITSCHE, OF NEW ULM, MINNESOTA.

AMUSEMENT DEVICE.

1,252,257.  Specification of Letters Patent.  Patented Jan. 1, 1918.

Application filed February 26, 1917. Serial No. 151,015.

*To all whom it may concern:*

Be it known that I, OTTO FRITSCHE, a citizen of the United States, residing at New Ulm, in the county of Brown, State of Minnesota, have invented certain new and useful Improvements in Amusement Devices; and I do hereby declare the following to be a full, clear, and exact description of the invention, such as will enable others skilled in the art to which it appertains to make and use the same.

This invention is an improvement in amusement devices particularly adapted for use in theatrical and other entertainments such as circuses wherein the same may be employed for races and like forms of amusement.

An object of the invention is the provision of an apparatus designed to simulate a horse, elephant, or other animal, and having means in the body thereof whereby the same may be either manually or mechanically propelled.

Another object is to provide a simple and efficient means for propelling the device and ventilating the interior thereof so that the operator therein may work under the most favorable conditions.

The inventive idea involved is capable of receiving a variety of mechanical expressions, some of which, for the purpose of illustrating the invention, are shown in the accompanying drawing, wherein:—

Figure 1 is a side elevation of one form of the invention.

Fig. 2 is a vertical longitudinal section thereof.

Fig. 3 is a fragmentary bottom plan.

Fig. 4 is a fragmentary side elevation, partly broken away and shown in section of another form of the invention.

Fig. 5 is a similar view of another modification.

Fig. 6 has a similar view of a still further form of the invention.

Referring to the drawing and more particularly to Figs. 1 to 3 inclusive, the numeral 10 indicates a body designed to simulate a horse or other animal, said body being provided with inner and outer linings 11 and 12 of any preferred material such as aluminum or other metal so that the body will be properly reinforced. Journaled transversely of the body adjacent the rear end thereof is a shaft 13 having the wheels 14 secured to the ends thereof and the bottom of the body is provided with an opening 15 adjacent the forward end thereof, through which the operator's legs extend in order that he may properly support the forward end of the said body 10 when the same is being propelled. The rear of the body 10 is closed by a door 17 to permit of access to the interior of the body.

Supported upon the bottom of the body 10 adjacent the rear end thereof is a suitable source of power 18, such as a gasolene motor, and having the usual crank shaft 19 upon which is mounted a sprocket wheel 20 driving a chain 21 which also passes over a sprocket wheel 22 carried by the shaft 13 and through this mechanism it will be readily apparent that when the motor 18 is operated the shaft 13 will be driven and the wheels 14 rotated. Coupled to the drive shaft 19 is a fan shaft 23 which preferably extends vertically and has a fan 24 mounted upon its upper end which is operated when the motor 18 is driven to properly ventilate the interior of the body. The exhaust pipe 25 of the motor 18 is extended to the head of the body 10 and has its outer end mounted therein.

In the form of the invention shown in Fig. 4, the body 26 is constructed similar to the body 10 but in this instance the same is manually propelled and for this purpose the body has mounted in the forward end thereof the shaft 27 upon which is mounted the wheels 28. The rear of the body 26 is provided with an opening 29 through which the body of the operator extends in order that he may walk and thus propel the device. The rear of the body is provided with a door 30 to permit the operator to enter the body, and secured to the bottom of the latter are shoulder straps 31 to aid the operator in supporting said body.

In the form shown in Fig. 5 the body is provided with a door 33 in the front thereof and an opening 34 in the bottom adjacent the front for receiving the operator's body. Shoulder straps 35 are also provided for use in supporting the body 32. The shaft 36 is supported in the body at the rear thereof and has the usual wheels 37.

In Fig. 6 the body 38 has a small periscope 39 mounted upon the top thereof through which the operator may see before him.

What is claimed is:—

1. A device of the character described comprising a body shaped to simulate an animal and having an opening in the bottom thereof through which the legs of an operator may be extended, a wheel carrying shaft journaled in said body, and a source of power mounted in said body for driving said shaft whereby to aid in propelling the device.

2. A device of the character described comprising a body having an opening adjacent one end thereof, a wheel carrying shaft adjacent the other end thereof, and shoulder straps secured to the body adjacent said opening and adapted to be engaged over the shoulders of an operator whereby to support said body.

3. A device of the character described comprising a body shaped to simulate an animal and having an opening in the bottom thereof through which the legs of an operator may be extended, a wheel carrying shaft journaled in said body, a source of power mounted in said body for driving said shaft whereby to aid in propelling the device, and a fan connected to said source of power for ventilating the interior of said body.

In testimony whereof, I affix my signature, in the presence of two witnesses.

OTTO FRITSCHE.

Witnesses:
FRED FRITSCHE,
JOSEPH SCHNING.

Copies of this patent may be obtained for five cents each, by addressing the "Commissioner of Patents, Washington, D. C."